Figure 1A:
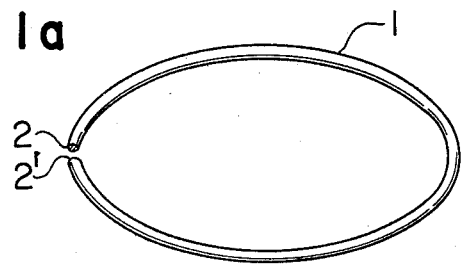

United States Patent [19]

Yazawa et al.

[11] 3,950,467
[45] Apr. 13, 1976

[54] METHOD FOR SHAPING TUBULAR FILMS IN DOWNWARD AND WET MANNER

[75] Inventors: Masahide Yazawa, Kunitachi; Kazuhiko Kurihara, Tokyo; Kenichi Narikawa, Tokyo; Hirosi Yazawa, Kunitachi, all of Japan

[73] Assignee: Polymer Processing Research Institute Ltd., Tokyo, Japan

[22] Filed: Feb. 6, 1974

[21] Appl. No.: 440,099

[30] Foreign Application Priority Data
Feb. 26, 1973  Japan................................ 48-22966

[52] U.S. Cl. .................. 264/89; 264/90; 264/95; 264/178 R; 264/210 R; 264/237; 425/71; 425/326 R
[51] Int. Cl.² .......................................... B29D 7/20
[58] Field of Search ......... 264/95, 89, 90, 209, 237, 264/178 R, 348, 210 R; 425/71, 72, 326 R, 378

[56] References Cited
UNITED STATES PATENTS

| | | | |
|---|---|---|---|
| 3,218,380 | 11/1965 | Euling et al............................ | 264/95 |
| 3,532,780 | 10/1970 | Kakutani et al. ..................... | 264/95 |
| 3,600,488 | 8/1971 | Yazawa................................. | 264/95 |

FOREIGN PATENTS OR APPLICATIONS

| | | | |
|---|---|---|---|
| 1,130,138 | 9/1956 | France................................ | 264/237 |

Primary Examiner—Jeffery R. Thurlow
Attorney, Agent, or Firm—Fred Philpitt

[57] ABSTRACT

A method for shaping a tubular film in a downward and wet manner is provided in which an extruded tubular film is coagulated in contact with a coagulation liquid which flows down along the inside surface of a cylindrical composite perforated wall composed of a cylindrical perforated wall and cylindrically piled up circular rings of coiled wire provided in a single layer and in contact with the inner surface of said cylindrical perforated wall, provided in a negative pressure chamber connected to the lower part of a coagulation liquid-supplying pool; in this coagulation, coagulation liquid is fully utilized by mixing with a reflux coagulation liquid formed when a part of coagulation liquid once flows out through said wall and is collected in a plurality of coagulation liquid-collecting weirs provided around the outer surface of said wall, and then flows again through said wall to the inside thereof; and said film is drawn downward while being supported on the inner surface of said wall by friction due to suction under negative pressure and taken up by pinch rollers.

2 Claims, 5 Drawing Figures

METHOD FOR SHAPING TUBULAR FILMS IN DOWNWARD AND WET MANNER

DESCRIPTION OF THE INVENTION

This invention relates to a method for shaping tubular films in downward and wet manner. More particularly it relates to a method for shaping tubular films by applying a composite guide wall of cylindrically piled up circular rings of coiled wire with outside suction chamber. The method is suitable for cases where tubular films are prepared from those having low inflation inner pressure and lacking tensity and self-supporting stiffness of balloons of inflated tubular films, and is particularly effective when a large amount of coagulation liquid is to be used.

The term "coagulation" referred to herein means not only coagulation by coagulant in the strict meaning, but also merely solidification by chilling.

For example when a tubular film is shaped by coagulating a dope of polyvinyl alcohol or polyacrylonitrile of a high concentration, a large amount of coagulation liquid of downward flow is employed and the viscosity of the dope, that is, the polymer solution is generally low; hence the inflation inner pressure is small. Moreover, since coagulation proceeds not so fast, the contact distance of coagulation liquid becomes longer. Thus low self-supporting stiffness of a long and large balloon of an inflated tubular film makes the shaping difficult.

When tubular film is prepared from a polymer melt, the melt has a higher viscosity as compared with the case of a dope, and hence in the coagulation by water cooling, it is possible to make the inflation inner pressure as high as about 10–20 mm water column in case of smaller shaping diameter less than 500 mm. Accordingly the balloon of the inflated tubular film is stable and has sufficient stiffness to be self-supporting. But since inflation pressure becomes smaller in approximately inversely proportional relationship to shaped diameter in case having the same thickness, the inflation inner pressure at the time of shaping a tubular film of as large a diameter as 1 m or more is reduced to less than several mm water column. Further the distance from a die down to take-up pinch rollers for folding the film becomes longer with increase of diameter of a balloon of the inflated tubular film. Accordingly when the inflation inner pressure is low, self-supporting of the balloon becomes difficult. Particularly when quenching effect is expected, the amount of cooling water to be used becomes larger, and accordingly, self-supporting of balloon becomes more unstable.

In U.S. Pat. No. 3,904,334 there is disclosed a method for promoting self-supportability of a balloon in case of lower inflation pressure and lower self-supportability of a balloon, by applying a negative pressure on the outer surface of a tubular film to utilize the sum of the pressure of inflation inner pressure and negative outer pressure. The present invention is an improvement in the method of the above-mentioned patent publication.

It is an object of the present invention to provide a method for shaping tubular films in which no obstacle occurs to operation even when a large amount of coagulation liquid is caused to flow down and a tubular film of a large diameter having no scratch marks on the surface is shaped easily and certainly from a polymer dope or a polymer melt, utilizing the coagulation power of the liquid fully and effectively through the stirring action of the liquid which occurs automatically.

The most significant point of the improvement of the present invention is as follows:

In the invention of the above-mentioned prior application, a perforated wall composed of a cylindrical net has been employed, through which suction force is exerted circumferentially from the outside, along which a coagulating liquid flows down and with the inner side of which a descending tubular film is contacting. In place of the above-mentioned cylindrical net, a particular device is employed in this invention, that is, a composite cylindrical perforated wall composed of a cylindrical perforated wall and cylindrically piled up circular rings of coiled wire (hereinafter referred to as coiled rings) provided in a single layer and in contact with the inner surface of said cylindrical perforated wall, the adjacent upper and lower coiled rings being contacted closely with each other and the descending tubular film being contacted with the inner side of said composite cylindrical perforated wall.

Further, this composite cylindrical perforated wall is so arranged that the inner diameters of the coiled rings can be varied in accordance with the change of the diameter of the tubular film in the course of film-making operations, for example, the coiled rings at least at the upper end part of said wall are so arranged that the inner diameters of the coiled rings can be made smaller stepwise towards the lower part of said wall correspondingly to the reduction in the diameter of the tubular film due to the shrinkage of the film through coagulation under a certain predetermined film-making condition.

If the method of the present invention is employed in a suitable arrangement of coiled rings determined under a certain film-making condition, then even when a large amount of coagulation liquid is fed to a tubular film, as explained later in detail, a greater part of the liquid flows through submerged parts of the composite cylindrical perforated wall existing close to the bottom of a pool for feeding coagulation liquid and flows down along the wall, and the remaining amount of the coagulation liquid is fed over the upper edge of the cylindrical wall from the surface of the pool. Thus a quiet flow is formed on the surface of the pool, and the frost line (coagulation-initiating line) of the descending tubular film is stabilized into a horizontal circular form. The liquid flowing down along the inside of the composite wall of the coiled rings and the returned liquid brought from the outside circumferential weirs are forced to flow through narrow gaps between coiled wires arranged regularly in a multiple step while receiving resistance and stirring action of the coiled wires. Accordingly, even when a large amount of coagulation liquid is used, the coagulation power of the liquid is utilized fully and effectively and the flow-down speed of the liquid is reduced without causing the draw-down (too much stretching downward or breaking) of the tubular film as seen in the case of high speed flow-down of the coagulation liquid. Since the tubular film is supported by suction from the outer circumference under a negative pressure as well as by friction in point or line contact with the circumference of the coiled rings at positions varying one after another, occurrence of scratch marks on the film surface due to the wall surface of the coil rings is prevented.

In the method of the present invention, the coagulation liquid is sucked out to the outer circumference of the perforated wall under negative pressure at the lowermost end part of the perforated wall and led into a separate pipe for discharge to the atmosphere thereby to make the amount of flow-down liquid accompanying the descending tubular film as small as possible, otherwise a large amount of flow-down liquid is divided into many streams on the film surface by the surface tension of the liquid and the downward tension of the tubular film caused by the flow-down liquid becomes non-uniform in the circumferential direction of the film, which results in the unevenness of tension toward the upper part of the tubular film.

Further a large amount of accompanying liquid is gathered and retained on the upper part of the pinch rollers installed below for taking up the film and liable to give the film wrinkles by its irregular flow.

In the method of the present invention the occurrence of this drawback has been prevented by removing the accompanying liquid flow from the film surface by suction under negative pressure at the lower most part of the perforated wall. This is also a characteristic feature of the present invention.

As for the sealing method of the outer circumference of the tubular film against negative pressure, in the same manner as in the case of the prior patent application, the upper part is sealed by the liquid retained in and flowing down from the pool for feeding coagulation liquid and the lower part is sealed by the liquid retained at the lower part of the perforated wall. Alternatively, the lower part is sealed as follows: pinch rollers are as well placed in a negative pressure chamber and the film flattened therebetween is passed through a liquid phase having a head corresponding to the difference of the pressure between the negative pressure chamber and open air to effect seal against negative pressure.

The method of the present invention will be described more fully referring to the drawings.

Figure 1B:
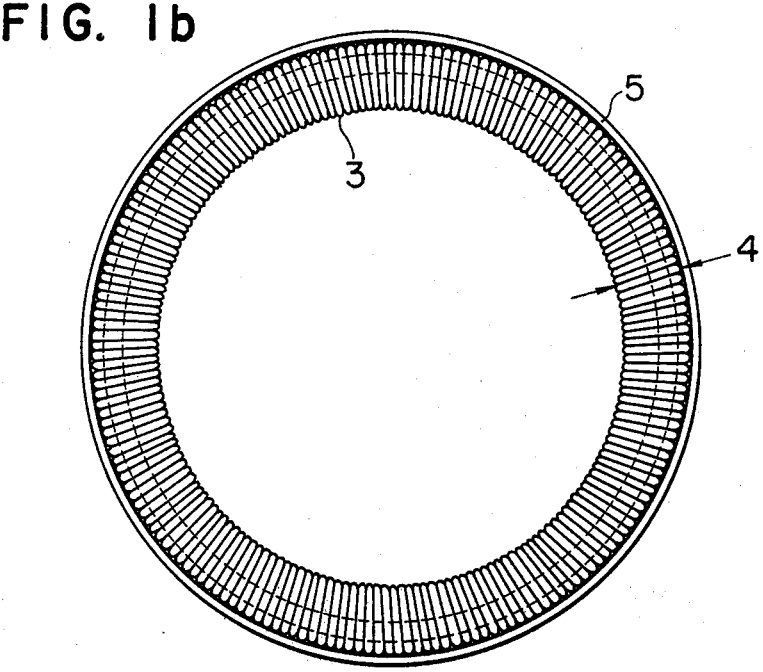
Figure 1C:
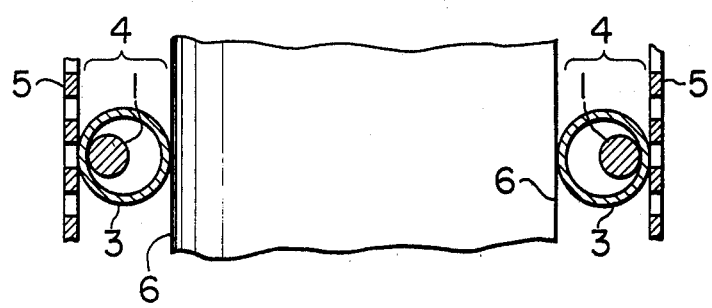
Figure 2:
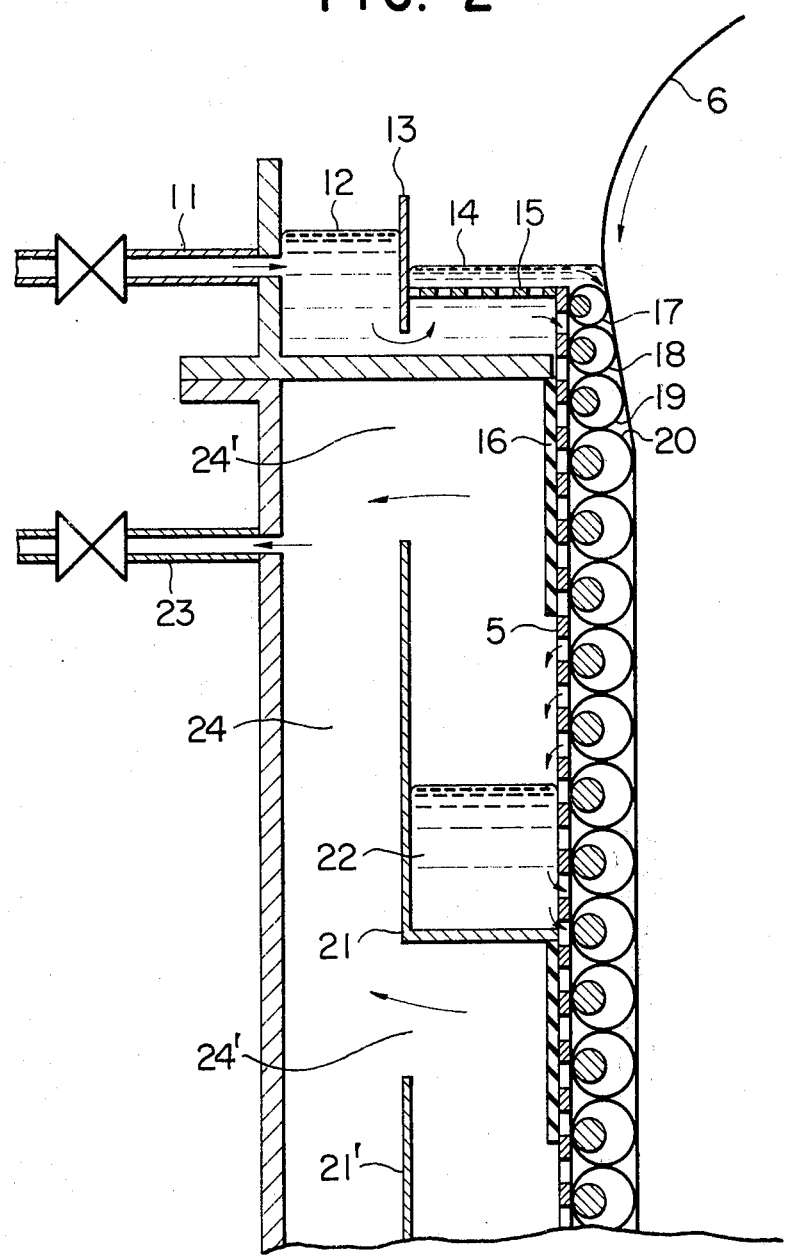
Figure 3:
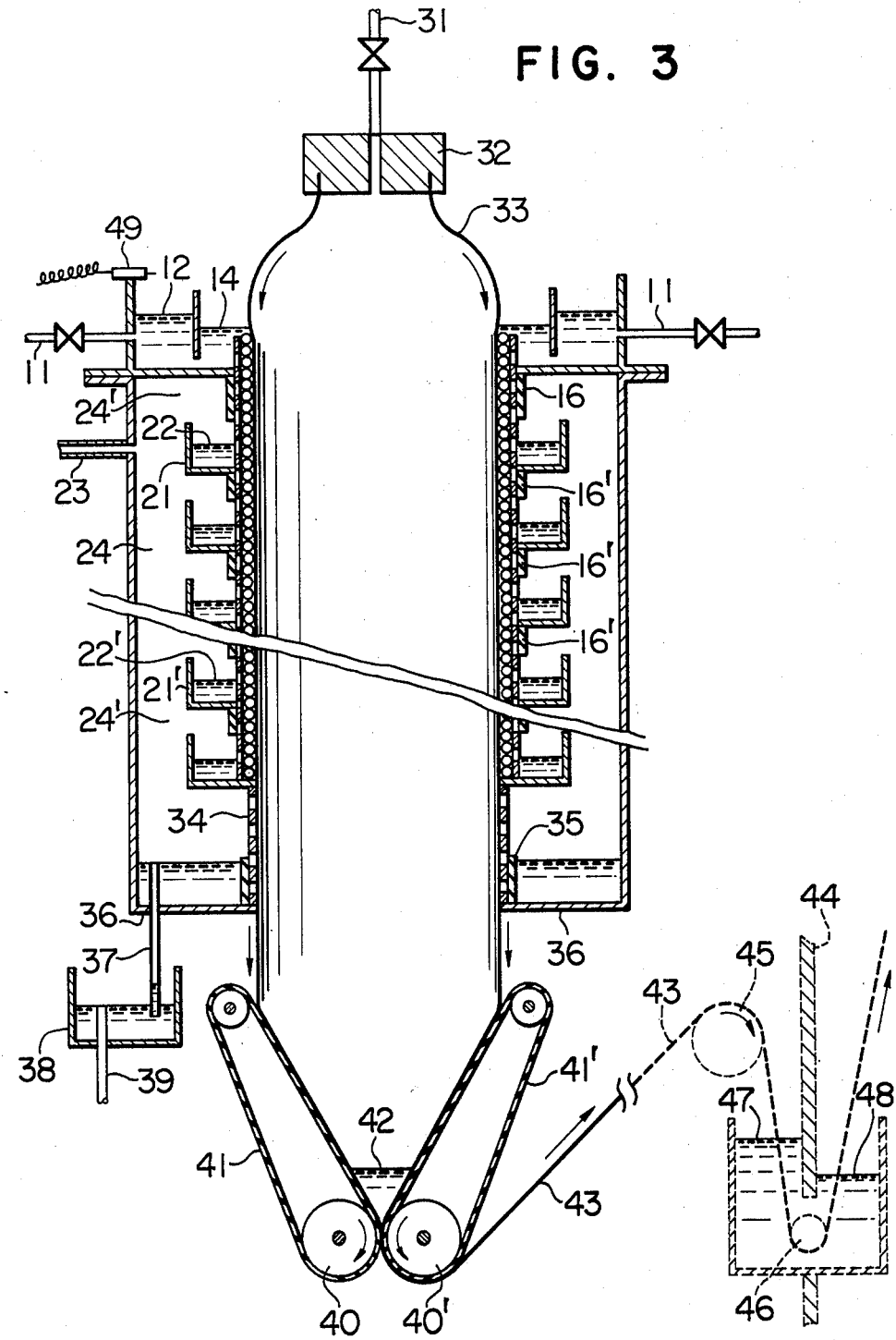

FIG. 1a is a perspective of one form of central ring rod spring passing through the inside of the coiled wire. FIG. 1b is a plan view of a composite guide perphorated wall with a coiled ring through which a central rod spring is fixed. FIG. 1c is an elevationally cross-sectional view of one step of coiled ring provided inside the cylindrical perforated wall. FIG. 2 is an enlarged schematic view of the partial vertical cross-section of the upper part of an apparatus used for carrying out the method of the present invention. FIG. 3 is a schematic vertical cross-section of the whole of an apparatus for carrying out the method of the present invention.

First of all, description will be given to coiled wire to be used in the present invention. As for materials of the wire, corrosion-resistant metal wires of 0.5–1.5 mm thick wound up into coils having a diameter of 5–10 mm with spaced gaps of 0.1–0.3 mm are generally useful. Of course, plastic materials are also useful.

A composite guide wall of cylindrically piled up coiled rings in multiple steps each internally contacting with the perforated wall can be so arranged that one step of coiled ring is formed by connecting both the ends of a coiled wire by thrusting them into each other to form a circular coiled ring and a number of said coiled rings are piled up to form a cylinder in a single layer of multiple step coiled rings, each internally contacting with the perforated wall under their own elastic force, but, in general, a device in which coiled ring as shown in FIGS. 1a, 1b, 1c is forced upon the outer wall by a central rod spring penetrating through the inside of each coil of the coiled ring is used as a reliable device.

FIG. 1a is a perspective view of rod spring 1 which is curved into an almost circular shape and penetrates through the inside of one circular coiled wire ring. Both the ends of this rod spring 2 and 2' are usually stably settled while keeping a certain distance, when left intact, but when they are connected together, the central rod spring takes an almost perfectly circular form and has an elasticity which always urges to expand outward. When this rod spring is passed through the central space of the coils of coiled wire having approximately the same length, and both the ends of this coiled wire are connected together by thrusting them into each other, coiled wire 3 forms a circular continuous body, and there is formed coiled ring 4 as shown in FIG. 1b, where an elastic force urging to extend the diameter of the coiled ring due to the elasticity of central rod 1 inside the central space of the ring is always acting. When coiled ring 4 is inserted inside cylindrical wall 5 in the direction perpendicular to the plane of paper, the central rod of the coiled rings moves from the center of the central space of the coil to expand itself as much as possible due to the spring action to push the coiled wire toward the perforated cylindrical wall. FIG. 1c shows the cross-sectional elevation of one step of coiled ring of this embodiment. In FIG. 1c there is shown a case where cylindrical wall 5 enclosing the coiled rings circumferentially is a perforated cylindrical wall. When a negative pressure is exerted outside the wall, said negative pressure propagates through the perforations of the cylindrical wall and the clearance of the coiled wire to the inside of the coiled rings.

Description will be given to other kinds of composite perforated wall useful in the present invention.

The central rod in the coiled ring of FIGS. 1a – 1c urges the coiled wire toward the outer wall by its spring action, as mentioned above, but if the central rod has no spring action urging to extend the diameter of the coiled wire and only keeps its original shape even when once deformed, a perforated cylindrical rubber wall which tends to shrink its diameter or a cylindrical net which tends to reduce its diameter due to the tension acting in the longitudinal direction thereof is used as the perforated wall enclosing the coiled rings circumferentially, whereby coiled wire 3 is pushed inward by the wall and moves toward its center and forms a wholly identical shape to those shown in FIGS. 1b and 1c. Since the function and effect of the composite perforated cylindrical wall thus arranged are wholly identical to those in the case of FIGS. 1a – 1c, it is intended to include the embodiment of this composite perforated cylindrical wall together with those shown in FIGS. 1b and 1c in the ambit of the method of the present invention.

The perforated wall of a cylindrical net used in U.S. Pat. No. 3,904,334 the invention is a simple perforated wall but the perforated cylindrical wall of the present invention is characterized in that it is a composite perforated wall composed of a cylindrically piled up circular coiled rings having many openings and inserted inside a simple perforated wall in a single layer and contacting therewith. Descending tubular film 6 is supported on the composite perforated wall, by suction and resulting friction under negative pressure exerted from the outer circumference.

If the coiled rings indicated in FIGS. 1b and 1c are stacked in a multiple step as shown in FIG. 3 and if the lowermost step is held by an inner circular rim projected from the outer wall toward the inside by a distance equal to or less than the thickness of coiled rings, a composite coiled ring wall of perforated cylindrical form is easily and stably constructed. The coagulation liquid which flows down along the outer circumference of tubular film 6, flows mostly between the part of coiled wire inside the central rod and the film contacting therewith because the passage way between the outside of the central rod and the outer wall where parts of coiled wire are found, is too narrow, as shown in FIG. 1c. If the clearance of coiled wire between the outer circumference of central rod and the outer wall is filled with a packing material such as a paste-form sealant, the descending coagulation liquid flowing down between the outside of the central rod spring and the outer wall will be null, and a part of the descending liquid is sucked through the clearance of coiled ring of each step to the outside of the perforated wall by negative pressure exerted from the outer circumference, and if this liquid is collected in a multiple step of outer peripheral weirs 21 and 21' as shown in FIGS. 2 and 3 and made to return into the inside of the perforated wall through the retained liquid level of coagulation liquid in pools 22 and 22', the descending liquid, on the whole, flows between the central rod and the tubular film. As shown in FIG. 1c, in the present invention the distance between the central rod and the tubular film is much wider than the distance in case of a tubular film internally contacting with a simple perforated wall. Unless coiled wires of coiled ring arranged in a multiple step are provided, the natural flow-down velocity becomes faster, and the amount of the liquid becomes larger. Further, there are cases where the liquid level of the feeding pool for coagulation liquid becomes unstable and the tubular film is pulled downward and broken. However, by the use of the arrangement of dense coiled wire in a multiple step, even when there is a thick liquid phase of coagulation liquid around the tubular film, the descending liquid undergoes the repetition of the resistance of coiled rings arranged in multiple steps, and its descending velocity is drastically reduced. At the same time, while the liquid gets into the spaces between coiled wires, it is stirred automatically. Thus, the coagulation power of descending liquid, e.g. mainly the concentration of coagulant in case of dope polymer and mainly the temperature in case of cooling coagulation, becomes uniform throughout the whole descending liquid at each level of pools whereby the maximum coagulation power of descending liquid is always utilized fully.

FIG. 3 shows a schematic vertical section of an apparatus for wet shaping of tubular film according to the present invention wherein the wall of the multiple step of coiled rings having the above-mentioned effectiveness is indicated.

One important problem in the downward wet-shaping of tubular film is how to prepare a film having neither irregular parts nor scratch marks on its surface. A tubular film shrinks with the advancement of coagulation, and it is important to make the tubular film always internally contact with a perforated wall unforcedly in accordance with the shrinkage particularly in the direction of diameter for the above-mentioned purpose. If the shrinkage proceeds too fast unexpectedly and thereby gap between the film and the outer wall becomes larger, the amount of flow-down liquid increases and the quiet liquid level of the feeding pool for coagulation liquid cannot be maintained. Further, if the tubular film is made to expand too much, the film contacts with the outer wall surface severely, forming heavy scratch marks and if further inflated, the film is caught by the wall. Since the shrinkage curve of tubular film to be shaped varies depending upon the shaping conditions of tubular film, which may vary according to various factors such as thickness and diameter of the tubular film to be shaped, shaping speed, amount and temperature of coagulation liquid, temperature of the dope or molten polymer, etc., it is necessary to seek, by experiment, for a wall of coiled rings arranged in a multiple step whose inner diameter becomes smaller gradually from the top thereof, and matches with the shrinkage of film in diameter under certain shaping conditions. In such a case, the method of the present invention is very advantageous because the coiled rings internally contacting with the upper end part of the perforated wall can be easily replaced from the top to the downside with ones which are more suitable for a desired shaping condition.

FIG. 2 is an enlarged schematic view of a vertical section of a part of the arrangement in which the inner diameter of the coiled rings, contacting internally with a cylindrical composite perforated wall connected to the down side of a feeding pool for coagulation liquid, can be gradually reduced in accordance with the coagulation shrinkage of tubular film at the upper end part of the wall.

The coagulation liquid fed from tube 11 is collected horizontally in the first ring form pool 12 and flows through the holes at the bottom of circular wall 13 into the second ring form pool 14 to rectify its stream. If horizontal perforated plate 15 is placed in the vicinity below the liquid surface of pool 14, the most part of the coagulation liquid fed flows directly into the coiled rings from the lower side of the plate 15 through the upper part of the perforated wall 5, as a submerging stream, and only a portion of the liquid which passes through the plate 15 to the upper side overflows onto the first step of coiled ring. According to this manner, even when a large amount of the coagulation liquid e.g. 20 to 50 times the weight of tubular film flows down around the tubular film, a quiet and calm flow is formed on the surface of the feeding pool, whereby the coagulation-initiating line of the tubular film is maintained in a horizontal and stable state. If cyclindrical rubber packing sheet 16 is applied to the outer circumference of the perforated wall just below the bottom plate of the pool, and its length is suitably selected, the suction force of negative pressure exerted from the outer circumference of the wall works upon the part between the perforated wall and the tubular film contacting therewith, from below the lower end of the sheet. Since the liquid receives the resistance of coiled wire of coiled rings arranged in a multiple step during its flow-down to said end, the suction force of the negative pressure exerted toward the liquid-feeding pool is gradually weakened. Thus it is possible to maintain always a constant height of liquid level in the pool and thereby effect flow-down of coagulation liquid in a required amount. The tubular film which contacts with the liquid descends while reducing the diameter thereof due to shrinkage of film, and in case of the coagulation of molten polymer by water cooling, particularly when the thickness of film is thin, completion of the coagulation is fast, shrinkage occurs rapidly and percentage of the shrinkage is large, while in case of the coagulation of polymer dope, the coagulation is slow even when the thickness of film is small, and coagulation is further retarded when the thickness is large, whereby shrinkage proceeds slowly and the total percentage of shrinkage is reduced. For example if the outer diameter of the coil of coiled ring 17 in the first step on the cylindrical perforated wall is 5 mm, coiled ring 18 in the second step is 6 mm, coiled ring 19 in the third step is 7 mm, coiled ring 20 in the fourth step and all of the subsequent steps are equally 8 mm, there occurs a shrinkage of 3 mm in radius and 6 mm in diameter. If the objective tubular film has 200 mm in diameter, the shrinkage of the tubular film due to coagulation is 3 percent. Usually, 5 percent or higher shrinkage often occurs. In case where the same polymer is shaped in the same thickness and the same diameter but at a higher speed, the increase of the outer coil diameter of ring i.e. the reduction of the diameter of the cylindrical inner wall of coiled rings from top to below should be at slower rate, and the rate should be accorded with the shrinkage of tubular film by changing the coil diameter of a greater number of the coiled rings arranged in a multiple step than the above-mentioned.

Below the lower end of packing sheet 16, a part of flow-down liquid is sucked out to the outside of the perforated wall by negative pressure and flows down along the outer periphery of the wall, and the tubular film is sucked toward the wall of coiled rings most powerfully under a fixed negative pressure. When coagulation is insufficient and suction force works so strongly that the film surface may be injured, the distance between the fixed position of the bottom of a ring-form weir around the perforated wall and the lower end of packing sheet 16 is shortened, and the level of the liquid retained in the weir is elevated and if necessary, said level is elevated higher than the lower end of packing sheet 16, whereby the force which sucks film toward the wall is weakened in accordance with the liquid level. Also even when a multiple step of weirs are installed, the suction force of negative pressure upon the tubular film can be reduced to any desired extent by covering the outer circumference of a part of the cylindrical wall below the bottom of each view with the cylindrical wall, namely, with a cylindrical packing sheet, thereby to make larger the height of the liquid retained in the weir and hence to reduce the amount of liquid sucked out to the outside of the wall.

Even in case where the above-mentioned type of weirs are employed under the same source of negative pressure, the suction force of negative pressure can be adjusted so that the film may be prevented from being strongly sucked onto the wall and injured on its surface, by weakening the suction force of negative pressure exerted around the weirs in the upper steps among the steps of weirs in the above-mentioned manner. Referring to FIGS. 2 and 3, even when the pressure of common negative pressure chamber 24 is reduced through pipe 23 under a fixed negative pressure and the weirs of each step are under the same negative pressure through upper opening 24′, the suction force of negative pressure exerted upon the tubular film in the weirs of each step can be weakened generally in the weirs of the upper steps. Of course it is possible to use separate negative pressure sources and place the weir in the upper step under a lower negative pressure. It is another feature of the method of the present invention, as mentioned above, that in varying the inner diameter of the wall of the coiled rings in the upper steps in accordance with the shrinkage of tubular film, the coiled rings are readily exchanged from the top thereof one by one.

FIG. 3 is a schematic view of the whole assembly of the apparatus for putting the method of the present invention into practice and FIG. 2 is a partially enlarged view of the apparatus of FIG. 3.

Tubular polymer 33 extruded downward from annular slit die 32 having pipe 31 for passing gas for internal pressure for inflation descends while being inflated by the inside inflating pressure which is small and approximately in inverse proportion to diameter, after inflation, and is contacted, around its outer circumference, with the coagulation liquid which flows over the wall of the coiled ring in the highest step at the feeding pool of coagulation liquid 14, and further descends while being coagulated in contact with a large amount of coagulation liquid which flows as a submerged stream through the coiled rings of the second step and subsequent steps situated above the bottom of the pool. Further, the tubular polymer descends while being contacted with the wall of the coiled rings by the suction force of negative pressure working from below the lower end of rubber packing sheet 16 which is attached on the part of the outer circumference of perforated wall just below the bottom of the pool and thereby almost completes the shrinkage in diameter by coagulation.

When the diameter of the inflated balloon of the tubular polymer changes owing to the change in the internal pressure thereof for some reasons with elapse of operation time, photoelectric tube 49 is installed to detect the diameter of the balloon, whereby the inflation pressure is regulated and the diameter of balloon is kept nearly at a contast value. The flow-down liquid once sucked out through the perforated wall is accumulated in circular weirs 21 and 21′ installed in multiple steps around the perforated wall, returns again inside the wall and flows down through the space in the wall of coiled rings. This descending liquid contacts the tubular film under its mean maximum coagulation power due to the resistance of coiled wires and the resulting automatically occurring stirring action.

The drawing shows an apparatus having weirs in many steps, but this is used usually for cases requiring a long time for coagulation such as shaping from a polymer dope and hence a long coagulation route. When a tubular film is shaped from a melt of a polymer by water cooling, provision of one or two step weirs is sufficient. A multiple step of weirs are installed only in case of high speed shaping of a tubular film as thick as about 0.15 – 0.3 mm.

After completion of coagulation, there is no need of stirring of flow-down liquid, and hence contacting with coiled rings inside the perforated wall is unnecessary. In the drawing, there is shown a construction in which perforated wall 34 having the same inner diameter as those of coiled rings, but having no coiled ring installed the wall is connected to the lower part of the wall of coiled rings.

The liquid flowing down along the outer circumference of the tubular film, is collected on bottom plate 36 at the lowest part of the wall 34 the circumference of which is wrapped down to the bottom, with elastomer packing sheet 35, by sucking out the liquid under a negative pressure. The collected liquid overflows through pipe 37 while the liquid level of the collected liquid is kept at a liquid column corresponding to negative pressure sealing. Pipe 37 is opened inside liquid vessel 38, and a liquid level rises in pipe 37 to effect a negative pressure seal and another overflow pipe 39 is provided in liquid vessel 38. As seen above, after passing through the composite perforated guide wall, it is advantageous to make the coagulation liquid flowing down together with the descending tubular film as little as possible, because too much accompanying liquid is liable to form uneven flow channels on the surface of the film due to its surface tension, which becomes a cause of the tubular film being non-uniformly drawn downward, and also when the accompanying liquid is collected on take-up pinch rollers 40 and 40' installed below, non-uniform wrinkles are liable to be formed on the tublar film in case of a low inflation internal pressure, due to the non-uniform flow of the liquid.

A large diameter tubular film is guided by belts 41 and 41' before it is foled by pinch rollers. At any rate, in case of a lower inflation internal pressure less than several mm of water column, liquid pool 42 is formed on the pinch rollers by injecting the liquid from the die side inside the tubular film, whereby the foled tubular film is pulled toward both the selvages thereof due to the pressure of the resulting liquid column. Otherwise, forming of wrinkles cannot be prevented. However, if the part below the feeding pool of coagulation liquid, including take-up pinch rolls, is installed in a big negative pressure chamber, and folded film 43, as shown by a dotted line in the drawing, is guided through rollers 45 and 46 and through a liquid vessel installed at the outer wall 44 of the big negative pressure chamber, in which liquid vessel a difference of liquid level corresponding to the negative pressure is provided between liquid level 47 in the negative pressure chamber and that in the atmosphere 48, the tubular film above the pinch rollers is inflated by the sum of internal pressure and outer negative pressure, and self-supporting property of the balloon of the coagulated tubular film below the perforated wall is promoted thereby. Thus it is possible to fold the tubular film without forming wrinkles even when the liquid pool is not provided inside the tubular film.

The coiled rings described in the foregoing part are those constructed as a unit in each step, but it is possible to employ a system in which a long central spring rod is used and made into a spiral form central rod, having a number of turns, along which a coil made of a thin wire having the same length is put so as to be penetrated by the central rod through the central space of the coil from one end to the other, and the resultant assembly is forced into the inside of the perforated outer wall so as to press the wall by the elasticity of the spiral central rod. Alternatively, said spiral form coiled ring assembly is wrapped with a perforated rubber sheet wall having radially shrinkable property or a reticulated body under tension in the longitudinal direction thereof, whereby the coiled wire is deviated toward the central direction. It is preferable that the upper end part of the composite perforated wall is constructed with independent coiled rings in every step, but it is easier to construct the part below the upper end part where frequent change of inner diameter thereof is not necessary, according to the system in which a coiled wire is put along and outside a spiral form central rod in one or a multiple step. Further if the bottom of weir is positioned on the level outside the boundary of each step, there is no apprehension that the tubular film is sucked at the end parts of the coiled wires in each step, and hence non-uniform arrangement of coiled wires at the joints causes no obstacle.

The method of the present invention is applied not only to film-making carried out through water quenching by using melt-extruder for polyolefins, polyvinyl chloride, polyvinylidene chloride, polystyrene, nylons, polyesters or the like, but also widely to wet type film-making such as wet type film-making from a high concentration (e.g. 40–50 percent) aqueous solution of polyvinyl alcohol carried out by using a concentrated sulfate solution, or wet type coagulation film-making from a dope (e.g. in a concentration of 50–60 percent) prepared by dissolving polyacrylonitrile in a hot organic solvent e.g. dimethyl sulfoxide or dimethyl formamide carried out by using an aqueous coagulation liquid.

The present invention will be more fully described in the following examples which are offered by way of illustration but not by way of limitation.

EXAMPLE 1

An apparatus shown in FIGS. 1a–1c, 2 and 3 was constructed as a wet type coagulation apparatus using coiled rings. As for concrete dimension, cylindrical perforated wall 5 having an inner diameter of 198 mm and a length of 200 mm was prepared from a punched stainless steel plate having holes of 2.5 mm in diameter. Weirs 21 and 21' were prepared in four steps spaced about 50 mm in distance. In the apparatus thus constructed, a lower part perforated wall 34 without coiled rings as shown in FIG. 3 was not used. The coagulation liquid collected in the weir in the lowest step among the four steps was guided to a separate pool for withdrawal.

As for coiled rings, those having outer diameters of 4, 5, 6, 7, and 7 mm, respectively, were arranged in this order from the top to the lower, and 20 steps of coiled rings having an outer diameter of 8 mm were piled thereunder. Each coiled ring was made of a 0.8 mm thick wire coiled with a gap of 0.2 mm. The coiled wire was forced upon cylindrical perforated wall 5 by central spring rod 1 passing through the inside of the coil. As for rubber packing sheet 16 shown in FIG. 2, the negative pressure exerted from negative pressure chamber 24 could be sealed while maintaining the required liquid level of the feeding pool of coagulation liquid, by making a height of said packing 10 mm. Other details were omitted here, and the system in which the whole assembly of the parts from numeral 43 to numeral 48 shown by the dotted lines in FIG. 3 together with pinch rollers were placed under negative pressure, was not employed in this example.

By using the above-mentioned apparatus, a molten polymer of low density polyethlene was extruded downward from an annular slit die having a diameter of 100 mm at a rate of 670 g/min. and connected with an extruded having a screw diameter of 65 mm. A film having a thickness of 0.07 mm was prepared using water of 30 l/min. at 15° C as a coagulation liquid, under a negative pressure of 30 mm water column.

During the path of the tubular film until it reached a coagulation liquid pool after inflated, photoelectric tube 49 was provided to control the inflation pressure so as to give a nearly constant inflated balloon diameter. At the contact part of the inflated balloon with the coagulation liquid, a quiet liquid surface was formed and the balloon descended in a state well fitted to the wall of coiled rings, whereby film-making was carried out in a very stabilized balloon state. When the balloon came out of the cylindrical wall of coiled rings, almost no coagulation liquid accompanied the film and more than 90 percent of the liquid was discharged from overflow pipe 37. The film folded in a flat sheet had no wrinkles nor scratch marks showing excellent transparency due to quenching effect. In spite of the flow of coagulation liquid in such a large amount, there was no sign of non-uniform flow of water and a uniform and beautiful film could be obtained.

EXAMPLE 2

In the production of polypropylene film, the same apparatus as that of Example 1 was used. Coiled rings having outer diameters of 4, 5, 5, 6, 6, 6, 7, 7, and 7 mm, respectively, were piled up and followed downward by those having an outer diameter of 8 mm piled up in 18 steps. As for rubber packing sheet 16, sealing was carried out by making a height of said packing 20 mm. By using water at a rate of 25 l/min. at 8° C as a coagulation liquid under a negative pressure of 20 mm water column, a 0.07 mm thick film was prepared at a rate of 18 m/min. In this case also, the stability of the balloon of the inflated tubular film was extremely good and a soft beautiful film having an excellent transparency due to uniform quenching effect could be obtained.

EXAMPLE 3

In the preparation of a film from a concentrated doe of polyvinyl alcohol by using a concentrated aqueous solution of ammonium sulfate, as a coagulation liquid, a following composite guide wall was used.

The guide wall consisted of 4 sections connected in series. The first section was for the highest part of a cylindrical composite perforated wall connected directly to a feeding pool for coagulation liquid in the same manner as in Example 1. The inner diameter and the height of stainless steel perforated plate 5 as shown in the drawing were 340 mm and 500 mm, respectively. Weirs 21 in the outer circumference had a pitch of about 50 mm and were arranged in 10 steps. As for coiled rings, those having an outer diameter of 8 mm were used in 4 steps, those of 9 mm, in 10 steps, in the order from the top, and below these, those of 10 mm outer diameter were used in 36 steps. Thickness of coiled wire 3 was 1.0 mm and clearance of each helically arranged wire was about 0.2 mm. Each coiled ring was forced upon the inner circumferential wall 5 by central spring rod 1, and the last step of the first section was supported by an inwardly protruded rib. The height of rubber packing sheet 16 was made 20 mm and negative pressure was sealed by the collected liquid in the feeding pool for coagulation liquid. The second and the third section subsequent to the first were constructed in the same structure by using a central spring rod in the coiled form of 50 turns as a central spiral rod which was laid through the central hole of a coiled wire having the same outer diameter (10 mm) as that in the lower part of the first section and the same length with the central spiral rod, and forcing the resulting compositie material upon the inside of perforated wall having an inner diameter of 340 mm, by the elasticity of the coil of the central spiral rod and further furnishing weirs in multiple steps, with a pitch of about 50 mm at the outer circumference of the cylindrical perforated wall, the bottom plates 21' of the uppermost and lowermost weirs were provided on the levels of the upper and lower ends of the above-mentioned long continuous coiled ring spiral, respectively.

In the fourth section, the inner diameter of a cylindrical perforated wall, having no coiled rings inside the wall, was made 320 mm and the outer circumference of a tubular film coming down from the third section was internally contacted directly with this simple perforated wall. The load of a multiple step of coiled rings internally contacted with the second and third sections was supported by a shoulder part on the fourth section where the inner diameter of the surrounding perforated wall was suddenly narrowed from 340 mm to 320 mm, and the liquid sucked out to the outside of the perforated wall in the fourth section was collected in a bottom weir and the collected liquid was separately led through pipe 37 to seal tank 38, whereby the accompanying liquid of the tubular film was made as little as possible.

In the film-making by the use of the above-mentioned apparatus, a dope prepared by dissolving polyvinyl alcohol in water on heating under pressure to give 45 percent concentration, followed by filtration and defoaming, was extruded through an annular slit die having a diameter of 300 mm, at 99° C and a rate of 1.65 kg/min. with a gear pump to prepare a film.

A coagulation liquid having a concentration of 40 percent and a temperature of 40° C was fed to a feeding pool of the coagulation liquid at a rate of 30 l/min. The negative pressure in negative pressure chamber 24 was made 20 mm water column. The height of packing sheet 16 in the uppermost step was made 25 mm and those in the steps lower than this were gradually lowered with the advancement of coagulation so that the suction force of negative pressure around the coagulating film might act stronger upon the film. In the second and subsequent steps, the height of packing sheet 16 was made a constant value of 20 mm. During the pass through the fourth section, the coagulation liquid accompanying the film was separated to be led to the outside of the wall around the film. The descending tubular film was foled into double layer sheet during the pass through pinch rollers installed in the negative pressure chamber and successively taken up.

At the time of the pinching, the folded sheet were turned into a single sheet having a width of 500 mm, due to insufficient coagulation of the inside layer of the double layer film. When this sheet was passed over rollers in a heat-treating vessel containing saturated ammonium sulfate solution at 100° C while turning its traveling directions on the rollers, by a distance of 15 m to complete coagulation and simultaneously to bring it into hardly water-soluble state, followed by removing attached ammonium sulfate by cold water washing and drying to give a flat sheet film of good transparency and excellent stretchability, having a thickness of about 0.07 mm and a width of 500 mm.

What is claimed is:

1. In the known method for shaping a tubular film wherein an extruded tubular film is drawn downwardly through the interior of a cylinder having perforated walls, a coagulation liquid stream is passed downwardly between the exterior of said downwardly moving (tubular film and the interior of said cylinder, negative pressure is applied from the exterior side of said cylinder so as to both draw some of the coagulation liquid outwardly through the perforations in the wall of said cylinder and to also draw the tubular film outwardly, the improvement which comprises:

disposing a plurality of annuli between the exterior of said tubular film and the interior of said perforated cylindrical wall, said annuli being arranged in aligned side-by-side relationship so as to essentially form a cylindrical array of annuli, each annulus comprising a helical coil arranged in a circular configuration so that the center of the helix is a circle that surrounds the exterior of said tubular film, the individual coils of each helix extending radially outwardly with respect to the exterior surface of said tubular film, whereby during shaping of the tubular film the coagulation liquid flows by gravity downwardly over and through each annulus and also in contact with the exterior of the tubular film, and the downwardly moving tubular film contacts each annulus in sequence in such a manner that the plurality of arcuate surfaces of each helical coil that actually contacts the tubular film essentially correspond to radial extensions of the tubular film.

2. A method according to claim 1 wherein the internal diameters of the annuli adjacent the area where the tubular film enters the array of annuli decrease progressively for a limited distance, whereby the shrinkage of the tubular film upon contacting the coagulation liquid is accommodated.

* * * * *